April 3, 1956   W. C. ROBERTS-HORSFIELD, JR   2,740,599
STABILIZED AIRCRAFT SEAT
Filed Oct. 9, 1951   2 Sheets-Sheet 2
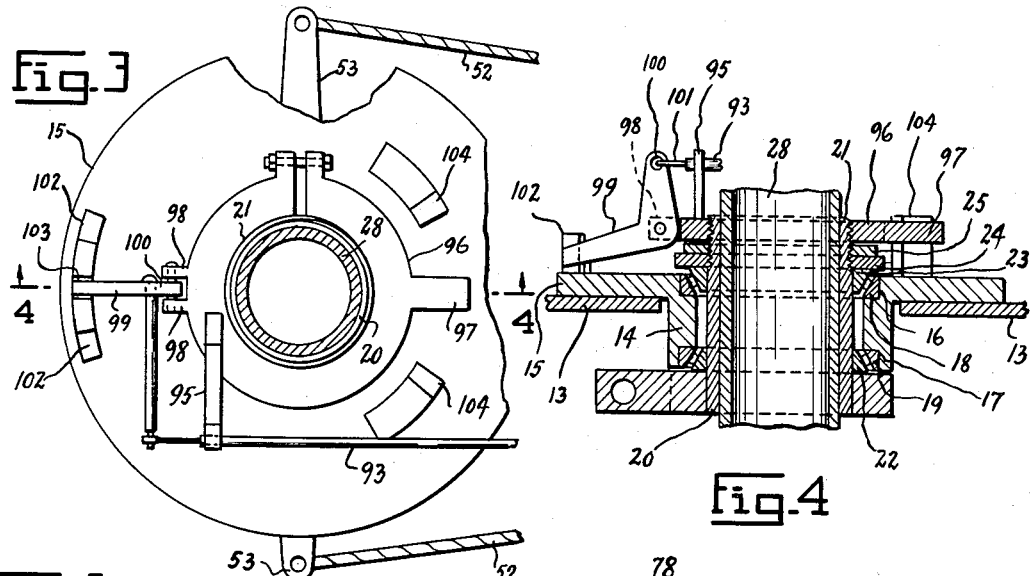
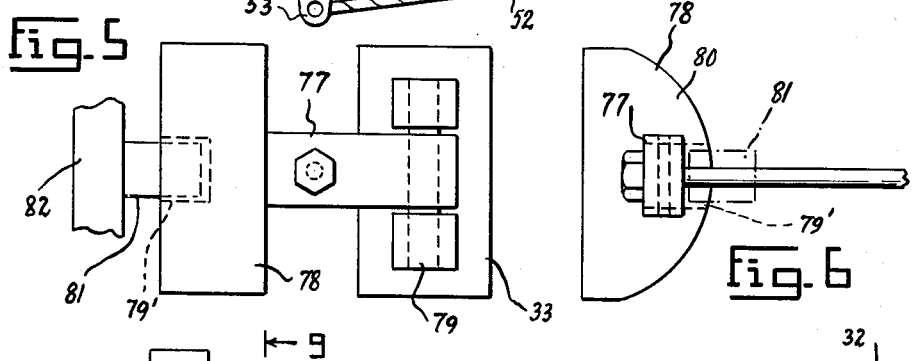
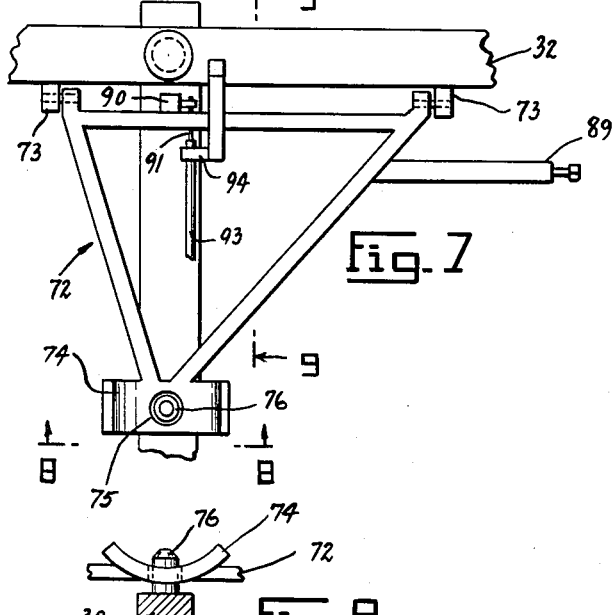
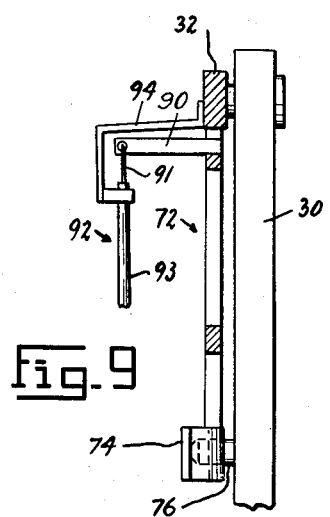
INVENTOR.
W.C. ROBERTS-HORSFIELD, JR.
BY H. M. Kilpatrick
ATTORNEY

United States Patent Office 2,740,599
Patented Apr. 3, 1956

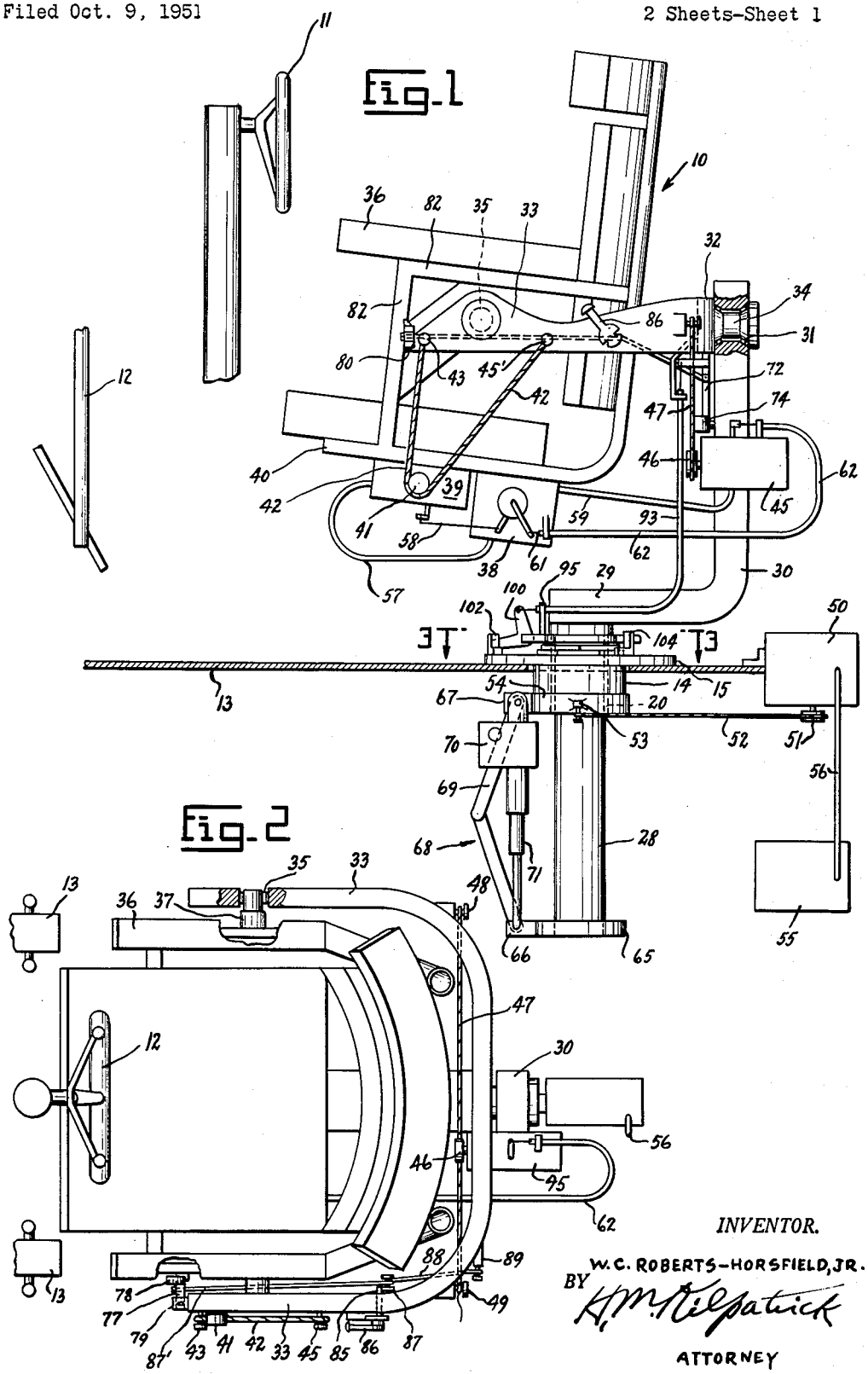

2,740,599

STABILIZED AIRCRAFT SEAT

William C. Roberts-Horsfield, Jr., Plainfield, N. J.

Application October 9, 1951, Serial No. 250,399

10 Claims. (Cl. 244—122)

This invention relates to aircraft and aircraft control and to means and methods for aircraft control by a human pilot and more particularly to aircraft apparatus facilitating control by the human pilot with or without the aid of instruments or the usual instrument panel, though it is noted that in some of the claims the invention is not limited to aircraft control.

Objects of the invention are to provide an improved device or apparatus of this kind to enable the pilot to sense changes of direction and attitude of the craft by means of his own senses without the aid of the usual instrument panel or without the necessity of viewing the horizon or ground.

To this end other objects of the invention are to provide means for maintaining the direction and attitude of the pilot constant regardless of the direction and attitude of the craft.

Additional objects of the invention are to effect simplicity and efficiency in such methods and apparatus and to provide an extremely simple apparatus of this kind which is non-fatiguing, safe, reliable, economical and durable in operation and economical to manufacture and install.

Still other objects of the invention will appear as the description proceeds, and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with aircraft control apparatus which briefly stated, includes a pilot seat indirectly supported on an upright post rotatively mounted in the craft structure and having a rearwardly offset upright yoke support on which is carried a substantially U-shaped yoke assembly having forwardly projecting arms and mounted at the middle of its yoke part on the upper part of said yoke support for movement on a substantially horizontal axis. The pilot seat has sides having at their upper parts transversely projecting alined journals substantially radial to the center of gravity of the occupant of the seat and rotatively received on the forward part of said arms. A flight gyro is mounted fast on the lower face of the seat bottom.

Means controlled by said flight gyro maintain the attitude of said seat substantially constant relative to the ground as the attitude of the structure changes. A directional gyro carried by the structure controls means for maintaining the direction of said seat headed in a substantially constant direction relative to the ground as direction of the structure changes. The essentials of the gyro controls are of the automatic aircraft control type shown in the Barth patent No. 2,485,953 of October 25, 1949.

Manually controlled means are provided for locking said post, yoke assembly and seat against movement relative to the aircraft structure.

In the accompanying drawing showing, by way of example, one of many possible embodiments of the invention, Fig. 1 is a fragmental side elevation partly in section showing the pilot seat, its support, and associated aircraft controls;

Fig. 2 is a fragmental plan of the same;

Fig. 3 is an enlarged fragmental plan partly in section taken on the line 3—3 of Fig. 1;

Fig. 4 is a sectional view taken on the line 4—4 of Fig. 3;

Fig. 5 is a fragmental front elevation partly in section showing a detail of the seat locking means;

Fig. 6 is a fragmental side elevation, partly in section, of said detail;

Fig. 7 is a fragmental front elevation showing the locking means for the yoke assembly; and Figs. 8 and 9 are fragmental sectional views taken respectively on the lines 8—8 and 9—9 of Fig. 7.

My improved stabilized aircraft pilot or crew seat 10 is shown in combination with usual aircraft controls 11, 12 and an aircraft crew compartment floor 13 having an opening therein receiving a directional axis bearing bushing 14 exteriorly provided with an upper horizontal base plate 15 secured to the floor, and having upper and lower internal grooves 16, 17 (Fig. 4) receiving internally coned outer bearing rings 18, 19 having coned surfaces converging toward each other. A rotating bushing 20 in said bearing bushing 14 having an upper externally threaded portion 21 carries respectively fast and loose thereon externally coned lower and upper inner bearing rings 22, 23 facing the outer rings 18 and 19. Roller bearings between adjacent rings 17, 22 and 18, 23 allow the bushing to rotate easily. An adjusting nut 24 on said threaded portion 21 and engaging the upper inner ring may be rotated for adjusting the clearance of the bearing rings 18, 19, 22, 23. A lock nut 25 on said threaded portion serves for engaging and locking the adjusting nut 24.

A vertical yoke support post 28 slidably fitting in said rotating bushing 20 and projecting below the bushing, carries on its upper end a rearwardly disposed radial arm 29 carrying an upright yoke support 30 rearwardly offset from the post.

Anti-friction bearings 31 are mounted in the upper end part of said offset yoke axially radial to the axis of the post and normally longitudinal to the aircraft. A substantially U-shaped yoke assembly 32, 33 is provided at the mid-part of its yoke part 32 with a rearwardly pointing short shaft 34 supported in said bearings 31 for rotation in either direction.

The arms 33 of the assembly are spaced apart and normally projecting forwardly in a substantially horizontal plane and are provided with axially transverse alined anti-friction bearings 35 mounted near the forward ends of the arms of said U-shaped assembly normally transverse to the longitudinal axis of the aircraft and transverse to the axis of said short shaft 34. The aircraft pilot or crew seat 10 has side arms 36 provided with alined outwardly projecting transverse journals 37 on a line substantially passing through the center of gravity of the occupant of the seat and received in said bearings 35 of the arms.

A vertical flight-gyro 38 of the automatic aircraft-control type and a lateral axis servo 39 are mounted fast on the lower face of the seat bottom 40, the servo 39 having an axially transverse operating drum 41 receiving a servo cable 42 wound around the drum and having its ends respectively secured to points 43, 45' on an arm of the U-shaped member forward and aft of the transverse journals 37.

A longitudinal axis seat-operating servo 45 mounted fast on the offset yoke support 30 is provided with a forward drum 46 rotatable on an axis longitudinal to the craft and receiving a cable 47 wound around the drum and having its ends respectively connected to pins 48, 49 in opposite end parts of the yoke part 32 of the U-shaped assembly.

A directional axis servo 50 fast to the aircraft structure has an axially vertical drum 51 and a cable 52 wound around the drum and having its ends secured to radial arms 53 (Fig. 3) of an upper clamp bracket 54 (Fig. 1) secured to the lower end of the rotating bushing 20.

A directional gyro 55 mounted on the aircraft structure is operatively connected by a cable 56 of electrical conductors to the directional axis servo 50 for operating the directional axis servo after the manner of rudder servo of the automatic aircraft control type. Instead of the directional gyro to control the servo 50, a directional radio steering device or a flux gate compass may be used.

Operative connecting means including a cable 57 of electrical conductors and a follow-up link 58 connecting the flight gyro with the lateral axis servo operatively connect the lateral axis servo 39 with the flight gyro for operating the lateral axis servo 39 after the manner of elevator servos of the automatic aircraft control type. Operative connecting means including a cable 59 of electrical conductors and a flexible control wire 61 having the ends of its flexible housing 62 mounted on the flight gyro housing and the longitudinal axis servo housing and in its inner wire are an operative connection between the flight gyro and the longitudinal axis servo to operatively connect the longitudinal axis servo with the flight gyro for operating the longitudinal axis servo after the manner of aileron servos of the automatic aircraft control type.

A lower bracket 65 secured to the lower end of the said post 28 has a radial arm 66 under a forward arm 67 of the upper bracket 54. A torque transmitting scissors assembly 68 comprising relatively pivoted members 69 pivotally secured to said arms 66 and 67 respectively serves to transmit torque from the rotating bushing 20 to the post when the servo 50 operates. A reversible motor 70 of a motor-operated telescoping jack screw 71 has its ends secured to the respective arms 66 and 67 of said upper and lower brackets for raising the pilot seat for adjusting to the height of the pilot or for raising the pilot during landing or taxiing to give a better view of the ground.

Means for locking the pilot seat and supporting parts will now be described. A downwardly pointed triangular yoke-lock bracket 72 (Figs. 1 and 7) is hinged at its upper corners to lugs 73 on the underside of the mid-part of said yoke part 32 and has formed on its lower corner a cam portion 74 of horizontally curved cross section providing a convexed cam face faced and intermediately curved toward the yoke support and intermediately provided with a lower opening 75 receiving a pin 76 fast on the vertical yoke support to hold the yoke assembly 32, 33 against movement on the short shaft 34.

An inwardly disposed seat lock-bracket 77, 78 (Figs. 2, 5 and 6) comprises an inner arm 77 pivoted between lugs 79 on the forward extremity of an arm 33 of the yoke assembly and having on its free end a block 78 having an inner rear recess 79' and convex cam faces 80 on both sides of the recess. A lug 81 fast on the seat arm frame 82 is received in said recess 79' whereby the seat may be locked against pivotal movement on the axis of the journals 37. A transverse operating shaft 85 rotatably mounted in one of said arms 33 has an outer radial handle 86 and an inner active crank arm 87 connected by links 87', 88 connecting the end of said crank arm to said lock seat bracket and a lateral arm 89 on the triangular bracket 72 whereby said brackets 72, and 77, 78 may be released from the lugs 76 and 81 by operation of said handle 86, as will be later explained.

A forwardly projecting arm 90 fast on the upper part of the triangular yoke lock bracket has connected thereto the upper end of an inner actuating wire 91 of a flexible control wire 92 having the ends of its housing 93 mounted on brackets 94, 95 mounted respectively on the yoke support 32 and a threaded clamp collar 96 on the upper part of said threaded portion 21 of the rotatable bushing 20 and having a radial rear tongue 97 and a pair of spaced forward ears 98.

A bell crank lever pivoted at its elbow part between said ears 98 on the collar 96 has an outwardly disposed lower arm 99 and has an upper arm 100 to which the lower end 101 of said inner wire 91 is secured, whereby operation of the handle 86 and said triangular bracket 72 also operates said bell crank 99, 100. A block 102 fast on said base plate 15 has a notch 103 in its upper face receiving said lower arm 99 to hold the rotating bushing from rotating.

The tongue 97 fast on said clamp collar is movable between vertical limit stop blocks 104 mounted fast on said base plate 15 for limiting movement of said clamp collar 96 and consequently the post 28 and yoke support 30.

Operation of the handle 86 (lower part of Fig. 2) rearwardly causes the crank 87' to move forwardly and push the bracket 77, 78 forwardly to move the recess 79 from the lug 81, thus to allow upward or downward movement of the lug 81 and the seat arm frame 82. The same rearward movement of the handle 86 and forward movement of the crank 87' pulls forwardly the link 88, the lateral arm 89, the bracket 72 (Fig. 7) the cam portion 74, the opening 75, thus withdrawing the cam portion 74 from the pin 76, thus releasing the bracket 72 and the yoke assembly 32, 33 for movement on the axis of the bearings 31.

The forward movement of the bracket 72 raises the free end of the arm 90, drawing the wire 91 and the arm 100, thus raising the lower arm 99 (Fig. 4) from the notch 103, thus releasing the clamp collar 96 and bushing 20 and allowing the post 28 to rotate.

*Operation.*—If during flight along its intended flight path, the aircraft should deviate from this intended flight path in direction (azimuth), a control signal furnished by the directional gyro 55 or directional radio steering device, or flux gate compass, to the directional axis servo 50 causes this servo 50 to turn the seat in relation to the aircraft in such a direction that the seat will remain headed in substantially the original direction of the intended flight path. Then the human pilot steers the aircract back to the original heading, and as this is being done the directional axis servo 50 will restore the seat in relation to the aircraft so that the seat will still remain headed in the intended flight path direction.

Should the aircraft change its attitude by banking in either direction, a control signal will be furnished by the flight gyro 38 which will cause the longitudinal axis seat-operating servo 45 to move the seat in relation to the aircraft in such a direction that the seat will remain upright. As the aircraft is turned to normal flight by the human pilot the flight gyro 38 will again send out a control signal which will cause the longitudinal axis seat-operating servo 45 to maintain the seat in upright position.

A nose up or nose down attitude of the aircraft will cause the flight gyro 38 to send a signal to the lateral axis seat operating servo 39 causing it to move the seat in such a direction forward or back in relation to the aircraft structure as to maintain the seat in an upright position. As the aircraft is returned by the pilot to level flight, the seat is maintained in an upright position by the lateral axis seat-operating servo 39 which receives control signals from the flight gyro 38.

The above several functions of the stabilized seat and its controls are described separately but the operations of the three servos and the resulting functions may take place at the same instant and in any combination of conditions encountered in the flight of the aircraft. The action of the gyros and seat-operating servos are smooth and dead beat, imparting a steady firmness and solidness to the seat position.

The electrically operated seat height adjusting motor 70 may be controlled by the occupant or may be controlled by coupling to the glide path channel of an instrument landing system.

The limit stops 104 on the plate 15 allow optimum directional movement, but prevent complete rotation of the seat assembly. The locks provided for each axis of motion may be operated simultaneously by the single crank handle 86 mounted on the yoke assembly.

*Advantages.*—A pilot flying an aircraft in clear weather in the daytime, uses the natural horizon as a reference to aid him in keeping the aircraft on a straight and level course. Occasional glances at the instruments tell the pilot the exact values that have to be known to navigate the aircraft. When an aircraft is flown at night or in inclement weather, the natural horizon is not visible. The pilot then has to rely solely on the instrument indications on the instrument panel. Loss of the natural horizon causes the pilot to fall back on his sensations of feeling as an aid to flying the aircraft. This requires the closest possible concentration on the instruments, as it has been proven that an aircraft cannot be flown by the sense of feeling alone.

Stabilizing the seat and the pilot about the three axes about which the aircraft moves, gives the pilot a ready and familiar reference to the aircraft attitude in direction and space. Thus, while the pilot seat remains level, should the aircraft be inclined downward, the instrument panel, the windshield, the controls, and likewise the floor under the pilot's feet, would move in a downward direction relative to the pilot, giving the pilot a readily understandable and natural indication of the aircraft's change in attitude.

My invention is not meant to take the place of the standard flight instruments in present day aircraft, but rather to supplement their indications and to remove the oppressive mental strain on the pilot caused by the present method of instrument flight using indicating instruments only.

The rate in change in attitude of an aircraft in flight at times is slow enough to be imperceptible to the equilibrium senses in the pilot's ears or to his sense of heaviness on the seat. Preoccupation with one instrument would make the pilot unaware of what was taking place; but with the stabilized seat, the moment the aircraft deviated from the intended course the pilot would see and feel the aircraft move around him.

The stabilized pilot's seat is especially valuable when the aircraft is flying on automatic flight control, as the pilot may check the functioning of this device without being constantly "on instruments" himself. Without the stabilized seat he would be required to stay on instruments all the time, as the translation from blind to instruments requires a time interval which is too hazardous to risk. In addition to the above, with a stabilized seat, the co-pilot can fly also without consulting the instruments and be in condition to take over if necessary, something he couldn't do if he weren't on instruments, and he certainly would be as tired as the pilot if he flew instruments along with him.

The stabilized seat is also invaluable when making landing approaches under instrument conditions. The pilot must give almost undivided attention to the cross pointer instrument. This in my opinion has been the cause of landing accidents, because due to the pilot's preoccupation with the landing instrument, the aircraft has been allowed to change its attitude without the pilot becoming aware of the fact until it was too late to do anything about it. With the stabilized seat this condition could not occur as the pilot would see the instrument as a whole and that he is looking at a change of position in front of him, giving ample warning in time to make the necessary corrections and avoid the accident.

As an additional aid to the landing procedure, the seat height adjusting motor may be coupled to the glide path receiver which will inform the pilot of the height of his aircraft in relation to the true height it should be, which is indicated by the height of the seat in the cockpit. The advantages of the stabilizer pilot seat have a tremendous bearing on the mental condition of the pilot, and will help him to perform his duties with a maximum efficiency.

I claim as my invention:

1. In combination, aircraft structure; a pilot seat mounted thereon for angular movement in any direction relative to the structure; a flight gyro carried by the seat; and means controlled by said flight gyro for maintaining the attitude of said seat substantially constant relative to the ground as the attitude of the structure changes; a directional gyro carried by the aircraft structure; and means controlled by said directional gyro for maintaining the direction of said seat headed in a substantially constant direction relative to the ground as direction of the structure changes.

2. In combination with aircraft structure, an upright post rotatively mounted in the craft structure; a yoke assembly mounted on the post for movement on a substantially horizontal axis; a pilot seat mounted on said assembly for movement on an axis substantially radial to the axis of said post and substantially passing through the center of gravity of the occupant of the seat; a flight gyro fast on said seat; a lateral axis and longitudinal axis servos respectively mounted on said seat and said yoke support respectively having operative connection with the gyro to be controlled by the gyro; operative connections between the lateral axis servo and said yoke assembly and between said longitudinal axis servo and the yoke assembly, for maintaining the seat level.

3. A combination as in claim 2 comprising a directional gyro and a directional axis servo mounted on said structure; operative connections between said gyro and servo, and between the post and servo for maintaining the seat headed in a constant direction.

4. In combination with aircraft structure, an upright post mounted in the craft structure and having a rearwardly offset upright yoke support; a substantially U-shaped yoke assembly having forwardly projecting arms and mounted at the middle of its yoke part on the upper part of said support for movement on a substantially horizontal axis; a pilot seat having sides having at their upper parts transversely projecting alined journals substantially radial to the center of gravity of the occupant of the seat and rotatively received on the forward part of said arms; a flight gyro fast on said seat; a lateral axis and longitudinal axis servos respectively mounted on said seat and said yoke support respectively having operative connection with the gyro to be controlled by the gyro; and operative connection between the lateral axis servo and said yoke assembly and between said longitudinal axis servo and the yoke assembly, for maintaining the seat level as the attitude of the structure changes.

5. In combination with heavier than air aircraft structure, a yoke support; a yoke assembly mounted on said support for movement on a substantially horizontal longitudinal axis normally longitudinal to the aircraft and radial to said vertical axis; a pilot seat normally faced forward in substantially horizontal position mounted on said assembly for movement on an axis substantially transverse to said longitudinal axis and normally horizontally transverse to the aircraft; a vertical flight gyro having its spinning axis substantially vertical and its housing fast on the lower face of the pilot seat and normally substantially horizontal; a lateral axis servo mounted fast on said seat; operative connection between said lateral axis servo and said yoke assembly for tilting said seat forward or rearward on said transverse axis; connecting means operatively connecting the lateral axis servo and the gyro and set in operation by the flight gyro when the aircraft, and with it the seat and gyro housing noses up and down, for causing said servo to tilt the seat and housing in the opposite direction until the seat attains its substantially horizontal position;

a longitudinal axis servo mounted fast on said support; operative connection between said lateral axis servo and said yoke assembly for tilting said seat to one side or the other on said longitudinal axis; connecting means operatively connecting the longitudinal axis servo and the gyro and set in operation by the flight gyro when the aircraft, and with it the seat and gyro housing banks in either direction, for causing said servo to tilt the seat and housing in the opposite direction until the seat attains its substantially horizontal position; the operation of said gyro connecting means and connections serving to enable the aircraft pilot during darkness to be relieved of mental strain and depend upon his senses to keep the aircraft level.

6. In combination with heavier than air aircraft structure, a yoke support movable on a vertical axis; a pilot seat mounted on said support and normally facing forward in the direction of the flight path, a directional gyro having its spinning axis substantially horizontal and having its housing fast on said structure; a directional axis servo mounted fast on said structure; operative connection between said directional axis servo and said support for rotating said support in either direction; and means operatively connecting the directional axis servo and the directional gyro and set in operation by the directional axis gyro when the aircraft deviates in one direction or the other from its predetermined flight path for causing said directional axis servo to rotate said support in the opposite direction until the seat is directed in said path to enable the aircraft pilot during darkness to be relieved of mental strain and depend upon his senses to keep the aircraft on a straight course.

7. In combination with heavier than air aircraft structure, a yoke support movable on a vertical axis; a yoke assembly mounted on said support for movement on an axis normally substantially longitudinal to the aircraft and radial to said vertical axis; a normally substantially horizontal pilot seat mounted on said assembly for movement on an axis transverse to said longitudinal axis and normally horizontally transverse to the aircraft; a flight gyro having its spinning axis substantially vertical and its housing substantially horizontal fast on the pilot seat; a lateral axis servo mounted fast on said seat; operative connection between said lateral axis servo and said yoke assembly for tilting said seat forward or rearward; connecting means operatively connecting the lateral axis servo and the gyro and set in operation by the flight gyro when the aircraft, and with it the seat and gyro housing noses up and down, for causing said servo to tilt the seat and housing in the opposite direction until the seat attains its substantially horizontal position; a longitudinal axis servo mounted fast on said support; operative connection between said lateral axis servo and said yoke assembly for tilting said seat and housing to one side or the other; connecting means operatively connecting the longitudinal axis servo and the gyro and set in operation by the flight gyro when the aircraft and with it the seat and gyro housing banks in either direction for causing said servo to tilt the seat and housing in the opposite direction until the seat attains its substantially horizontal position; a directional gyro having its spinning axis substantially horizontal and having its housing fast on said structure; a directional axis servo mounted fast on said structure; operative connection between said directional axis servo and said support for rotating said support in either direction; and connecting means operatively connecting the directional axis servo and the directional gyro and set in operation by the directional axis gyro when the aircraft deviates in one direction or the other from its predetermined flight path for causing said directional axis servo to rotate said support in the opposite direction until the seat is directed in said path; the cooperation and operation of said gyros, servos, connections and connecting means serving to enable the aircraft pilot during darkness to be relieved of mental strain and depend upon his senses to keep the aircraft on a straight and level course.

8. In combination, aircraft structure to be guided in a substantially constant forward direction; a pilot seat mounted thereon normally facing toward the forward part of the structure and mounted for angular movement, on a substantially vertical axis, relative to the structure; a directional gyro carried by said aircraft structure; and means controlled by said directional gyro for maintaining the direction of said seat faced in said forward direction as the aircraft structure changes its direction from said forward direction; to enable the aircraft pilot while keeping his eyes on the instrument board during darkness to see the aircraft structure change its direction, thus to be relieved of mental strain and depend upon his senses in addition to instruments to keep the aircraft on a straight course.

9. In combination, aircraft structure to be controlled; a pilot seat mounted thereon for angular movement in any direction relative to the structure and having a normal attitude; a flight gyro carried by the seat; and means controlled by said flight gyro for maintaining the attitude of said seat substantially normal, constant and level and the pilot upright relative to the ground as the aircraft structure very rapidly turns sharp curves and the attitude of the structure changes; to enable the aircraft pilot during darkness while keeping his eyes on the instrument board to see the attitude of the aircraft change, thus to be relieved of mental strain, and depend upon his senses in addition to instruments to keep the aircraft under control.

10. In combination, aircraft structure to be guided in a substantially constant forward direction; a pilot seat mounted thereon for angular movement in any direction relative to the structure and normally facing the forward part of said structure and having a normal attitude; a flight gyro carried by the seat; and means controlled by said flight gyro for maintaining the attitude of said seat substantially normal, constant and level and the pilot upright relative to the ground as the aircraft structure very rapidly turns sharp curves and the attitude of the structure changes; to enable the aircraft pilot during darkness while keeping his eyes on the instrument board to see the attitude of the aircraft change, thus to be relieved of mental strain and depend upon his senses in addition to instruments to keep the aircraft under control; a directional gyro carried by said aircraft structure; and means controlled by said directional gyro for maintaining the direction of said seat faced in said forward direction as the aircraft structure changes its direction from said forward direction; to enable the aircraft pilot while keeping his eyes on the instrument board during darkness to see the aircraft structure change its direction thus to be relieved of mental strain and depend upon his senses in addition to instruments to keep the aircraft on a straight and level course.

References Cited in the file of this patent

UNITED STATES PATENTS

| Number | Name | Date |
|---|---|---|
| 640,051 | Tower | Dec. 26, 1899 |
| 967,278 | Wertheim | Aug. 16, 1910 |
| 994,782 | Paton | June 13, 1911 |
| 1,081,147 | Pressey | Dec. 9, 1913 |
| 1,382,174 | Dawson | June 21, 1921 |
| 2,101,145 | Lee | Dec. 7, 1937 |
| 2,312,473 | O'Hare | Mar. 2, 1943 |
| 2,397,477 | Kellogg | Apr. 2, 1946 |
| 2,466,164 | Evans | Apr. 5, 1947 |
| 2,580,453 | Murray | Jan. 1, 1952 |
| 2,619,623 | Meredith | Nov. 25, 1952 |

FOREIGN PATENTS

| Number | Country | Date |
|---|---|---|
| 217,318 | Germany | Dec. 21, 1909 |
| 617,240 | Great Britain | Feb. 3, 1949 |